A. Balding,
Lift Pump.
No. 104,688.  Patented June 28, 1870.
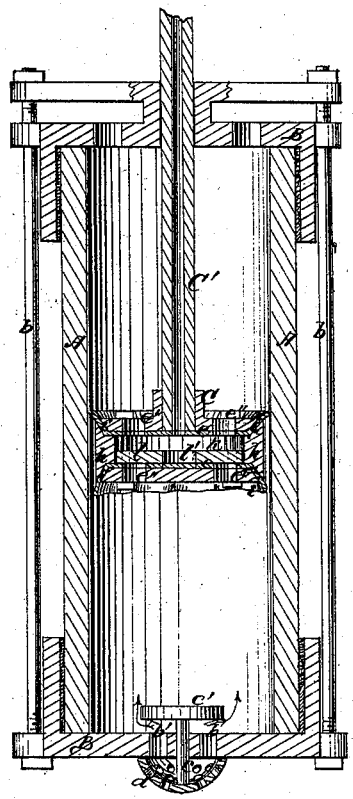

United States Patent Office.

ANSON BALDING, OF WHEELING, WEST VIRGINIA.

Letters Patent No. 104,688, dated June 28, 1870.

IMPROVEMENT IN PUMPS.

The Schedule referred to in these Letters Patent and making part of the same.

*To all whom it may concern:*

Be it known that I, ANSON BALDING, of Wheeling, in the county of Ohio and State of West Virginia, have invented a new and useful Improvement in Pumps; and I do hereby declare that the following is a full, clear, and exact description of the same, reference being had to the accompanying drawing making a part of this specification, in which the figure is a sectional elevation.

This invention has for its object to produce a constant stream of water from a pump-cylinder by the operation of a single double-acting hollow piston, which receives water into its chamber alternately through orifices in its upper and lower disks, according as the piston moves up and down and discharges the same through its hollow piston-rod, the water having been filtered previous to its introduction to the cylinder.

In the drawing—

A is the pump-barrel, which is made of glass, with parallel inner sides.

B B are hollow metal cylinders, each closed at one end, which inclose the ends of the barrel, and are fastened together by rods $b$ and nuts in the usual manner.

A hempen packing is placed between the barrel and the metal cylinders.

In the bottom plate B are orifices $b'\ b'$, and between them a central orifice, through which passes a vertical valve-stem, $c$, which bears a saucer-shaped filter, $d$, at its lower end, and a solid disk, $e'$, at its upper end.

C is a hollow piston, formed of upper and lower disks $e\ e$, fastened apart by rods and nuts, a ring, $h$, between the edges of the two disks, and leather strips $i\ i$ clamped between the edges of the ring and disks, and projecting sufficiently outside of the piston to form water-tight packings between it and the cylinder.

The disks $e$ are provided with orifices $e''$, and between them is the chamber $k$, in which is the transverse valve $l$, pierced with a central orifice, $l'$, and arranged to cover the orifice $e'$.

The piston-rod C' is hollow from end to end.

The operation is thus:

On forcing the piston downward, the lower packing $i$ is pressed against the interior of the cylinder by the water in the barrel. The disk $e'$ is thrust downward so as to close the orifices $b'$, and the water enters the chamber $k$ through the lower orifices $e''$, causes the valve $l$ to close the upper orifices $e''$, and finds its way out through the hollow stem C'.

On raising the piston, the water above it is forced out in a similar manner through the upper orifices $e''$ and hollow stem, and the water outside the barrel enters through the filter $d$ and orifices $b'$.

The rod C' is moved up and down by a lever at the top. All the water that gets into the barrel is cleansed by the filter.

Having thus described my invention,

What I claim as new, and desire to secure by Letters Patent, is—

1. The barrel A, in combination with the filter $d$ and disk $c'$, as and for the purpose described.

2. The combination of the piston-head C with the packing-strips $i$, when the latter are clamped between the disks $e\ e$ and ring $h$, in the manner and for the purpose specified.

ANSON BALDING.

Witnesses:
CHAS. A. PETTIT,
SOLON C. KEMON.